Figure 1:
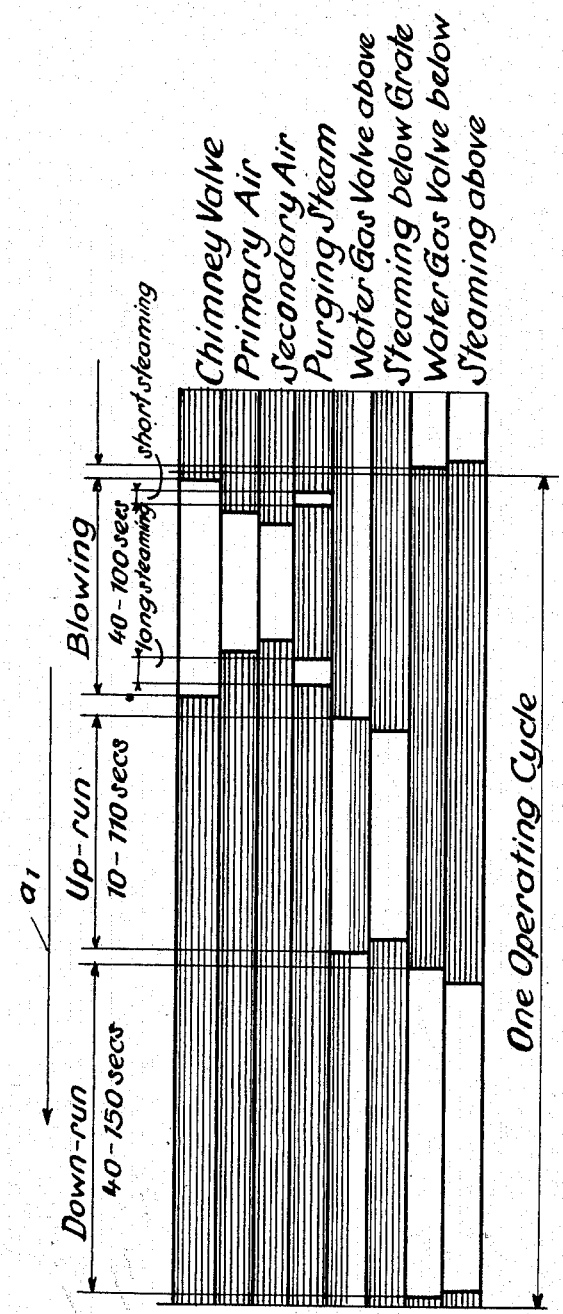
Figure 2:
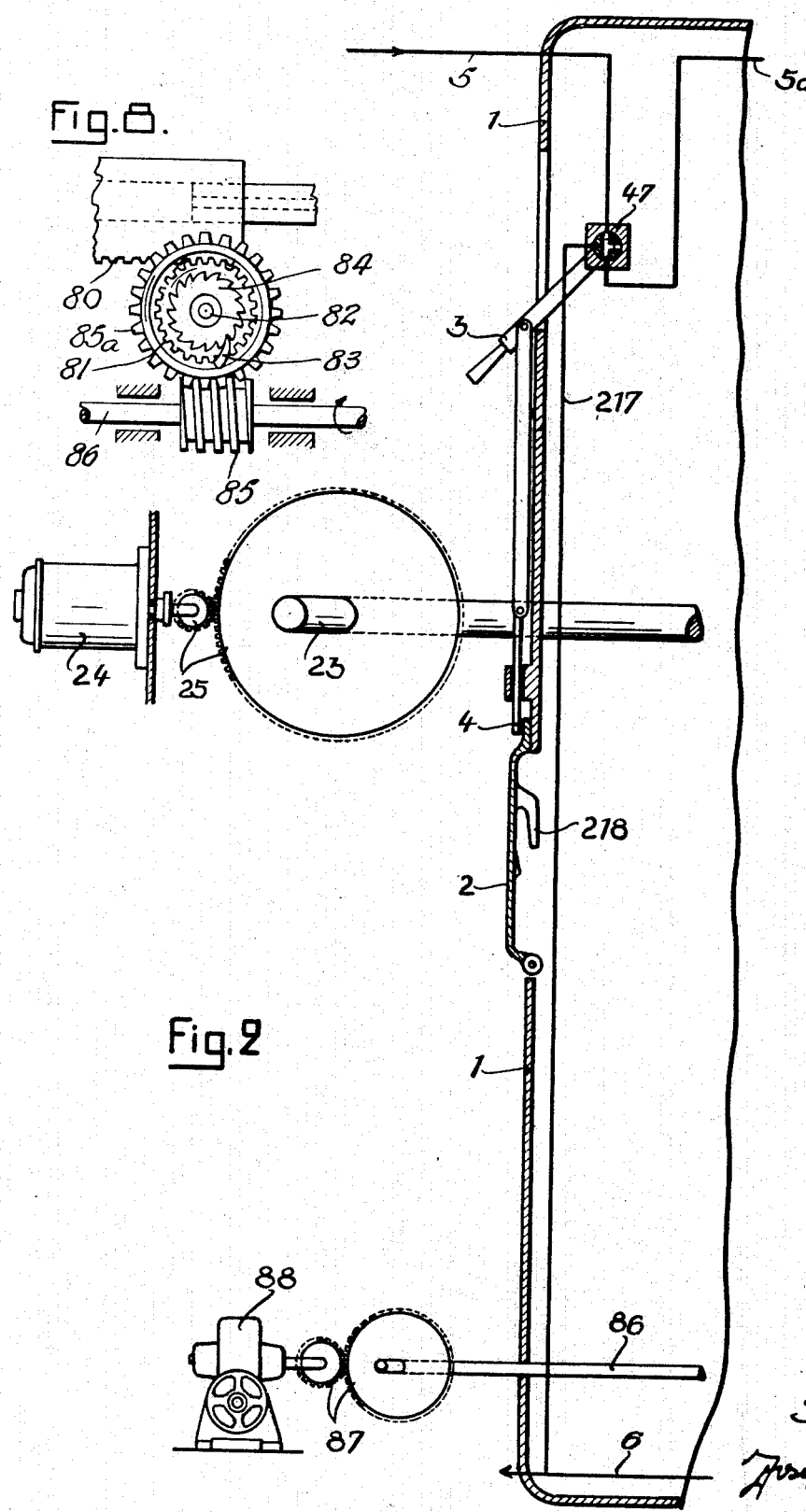
Figure 3:
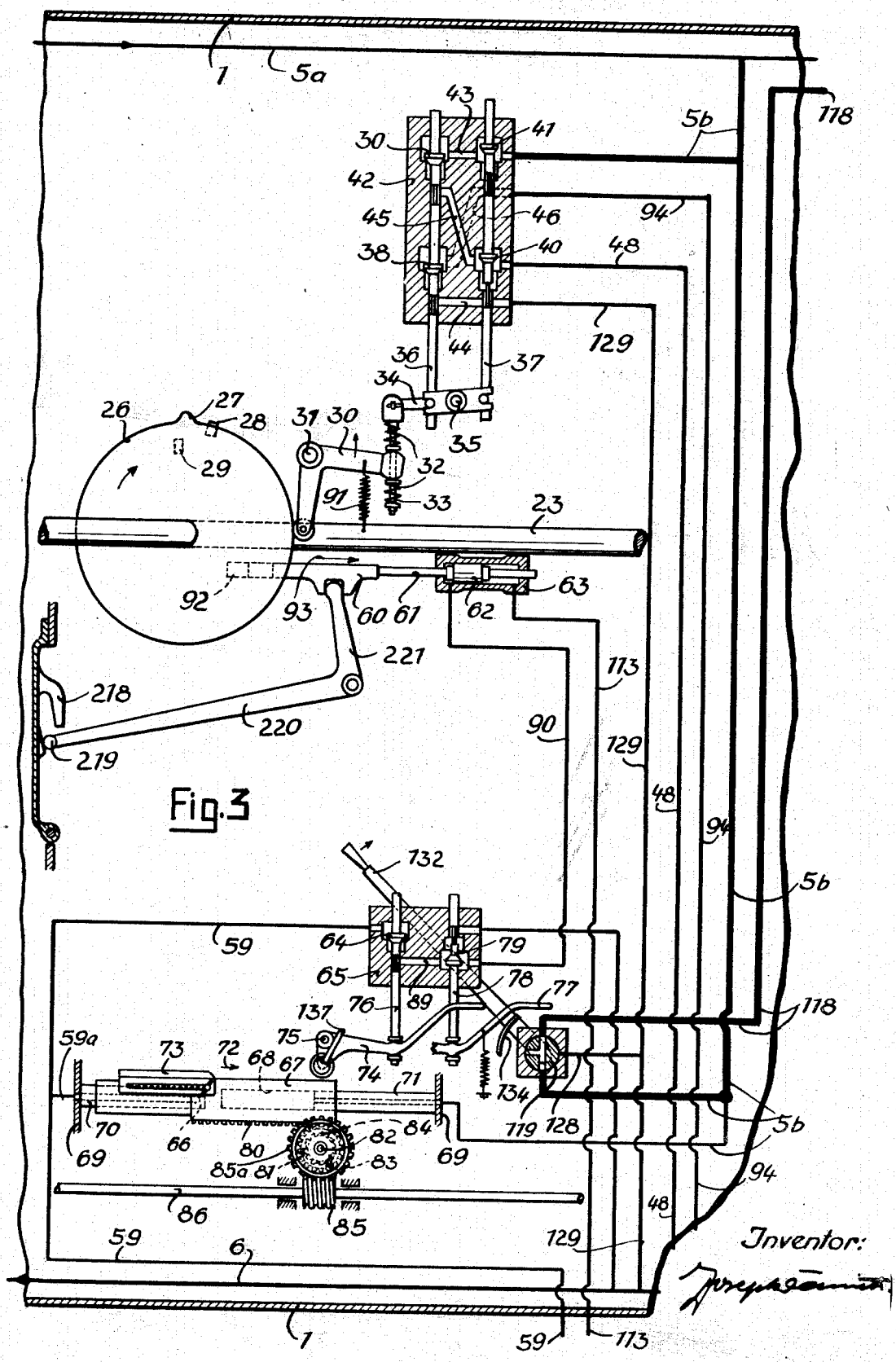
Figure 4:
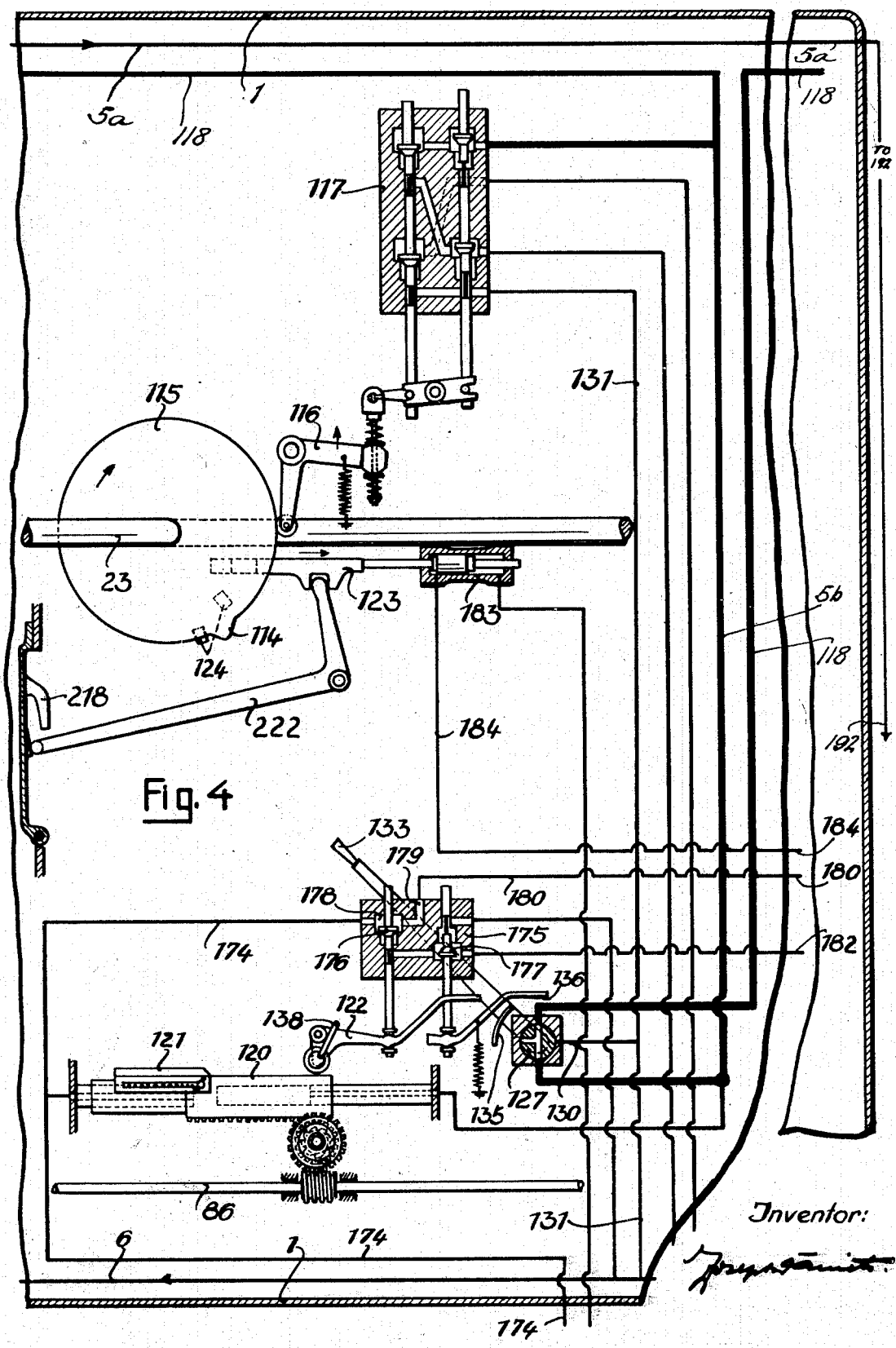

Patented Aug. 19, 1941

2,252,801

UNITED STATES PATENT OFFICE 2,252,801

AUTOMATIC CONTROL FOR WATER-GAS PLANTS OR THE LIKE

Joseph Daniels, Essen, Germany, assignor, by mesne assignments, to Koppers Company, Pittsburgh, Pa., a corporation of Delaware Application April 2, 1938, Serial No. 199,688
In Germany April 2, 1937

14 Claims. (Cl. 48—83)

This invention relates to automatic controls for shut-off valves or other closing means of water gas plants, blast-furnace hot blast stoves or other purposes in which a series of means is to be moved, reciprocated for instance to open and closed positions in a determined sequence by contrivances or devices which are operated by hydraulic pressure or compressed air.

The invention relates in particular to controls for the shut-off valves of intermittently operated water gas plants and in the following description the present invention is described in more detail with special reference to this working field without, however, limiting the invention in all its aspects to use with water gas plants.

It is known to produce water gas in such a manner that a fuel, after being charged into a suitable gas producer, is heated to a high temperature by partial combustion with air, whereupon the air supply is stopped and steam is passed through the glowing fuel. The steam reacts with carbon at a high temperature with the formation of the so-called water gas, a mixture consisting of hydrogen, carbon monoxide and carbon dioxide. As soon as the fuel is cooled down by the endothermic water gas reaction, the supply of steam is interrupted and air is introduced again through the fuel mass in order to heat it up again.

For the production of water gas, it is often usual to employ a gas producer consisting essentially of a shaft furnace, which is connected with the various pipe lines for the supply of air required for the hot-blast, for the supply of steam, and for the offtake of water gas, and also connected with the chimney through which the combustion gases developed during the hot-blast period escape. Each of these pipe lines is controlled by a shut-off valve or another suitable closing means in such a manner that the respective pipe lines are opened or closed at a given time. Often, it is usual to make use of hydraulic contrivances for the manipulation of the shut-off valves or the like, for example those operated by oil at high pressure. Manipulating devices operated by compressed air are also sometimes adopted for the valves.

As already mentioned, the shut-off valves of a water gas plant have to be operated in a given sequence. It is therefore most important that each individual valve finishes completely its movement, i. e. either the opening or closing movement before the following valve is actuated. Otherwise it may happen that dangerous operating difficulties occur. If, for instance the air valve is still somewhat opened so that air can enter the gas producer, while water gas is being generated in it by the introduction of steam, a certain quantity of air may enter the water gas so that highly explosive mixtures of air and gas might result. On the other hand, it is possible that some of the valuable water gas may escape through the chimney damper, if the same is not fully closed.

A great number of suggestions have already been made for the development of contrivances which make possible a fool-proof and proper reversal of the shut-off means of water gas production plants. It has, however, been found that none of the known reversal or controlling apparatus answers fully the above requirements, i. e. to prevent a movement of the shut-off valves in the event that one of them has not fulfilled its function at any time without on the other hand causing other disadvantages with the use of these safety means.

The main object of the invention consists in the provision of a control for water gas plants or the like which is capable of fulfilling the following fundamental requirements:

(1) The control must be able to give a definite but variable sequence for the manipulation of the various shut-off valves.

(2) In case of difficulties, for example if any of the valves has not reached fully its end position, the further reversal of the valves must be interrupted automatically at once.

(3) The time between the actuation of the individual shut-off valves must be highly variable and on the other hand accurately adjusted.

(4) No alteration in the sequence or in the operating periods must reduce the safety of the plant against faulty operation, or in other words, no alteration must stop the shut-off means from acting to prevent the further movement of the controlling apparatus in case of mistakes.

(5) Finally, it must be possible to make alterations to the position of the individual shut-off means by hand at any time, without changing the control in its entirety.

The former automatic controlling apparatus for water gas plants generally consisted of a control similar to a reversing clock which at a given time and in a given sequence manipulated the valves, through which the pressure medium passed to the various valve operating cylinders to be operated. With the known controlling apparatus, difficulties arose by reason of the sticking or incomplete closing of valves or the like without stopping the controlling apparatus. The operator supervising the apparatus was relied upon to stop the control, he being able in such cases to press push buttons or the like by means of which the clock would be put out of operation and the movement of the other shut-off valves stopped.

With the comparatively quickly succeeding reversals required of the numerous cut-off valves of a water gas plant, a control machinist can no longer be expected to give the uninterrupted attention which is necessary in order to watch over large plants.

I have already described in my U. S. patent application Serial No. 189,241, filed February 7, 1938, a new improved control or switch mechanism for several cut-off valves, preferably those of blast furnace hot-blast stoves of the Cowper system or the like.

The control formerly described works fully automatically. Therein I use stop or blocking valves which are operated by the shut-off valves after reaching a given end position. If one of these shut-off valves does not come into its proper end position, the movement of the remaining valves is prevented at once. The automatic control as described in my prior patent application is especially suitable for Cowper stoves or similar plants in which the valves need not be reversed so often and in which, except for one valve for example serving to govern the delivery of washing steam, all other valves are opened or closed only once during one run.

In water gas plants it is, however, necessary to open and close more than once within a single operating period or cycle certain valves and it is necessary to provide for an adjustable pause between the opening and closing as required by the water gas production process.

In order both to meet this requirement and to fulfil all the other conditions already pointed out above as being necessary for a proper sequence control apparatus for water gas plants or the like, and at the same time make use of the simplest possible reversal processes and means, I have now developed a new and improved sequential control apparatus.

Moreover, my invention also extends to the means for the operation of the fuel supply members which are provided on the gas producer for introducing the fuel.

The invention extends in particular to apparatus for the production of water-gas according to the so-called intermittent process. In this type of water-gas production, fuel introduced into the gas producer is first of all heated to a high temperature by blowing air through the fuel. Steam is then introduced into the heated fuel and combines with the carbon forming the so-called water-gas a mixture of hydrogen, carbon monoxide and carbon dioxide. As soon as the temperature in the gas producer has fallen to such an extent through the heat consumption of the water-gas reaction, that the formation of water-gas ceases, or is very slow, the supply of steam to the gas producer is interrupted, and the charge in the gas producer is again blown hot by the introduction of air. This is the principle of the water-gas production referred to in this application as the so-called intermittent or discontinuous water-gas process.

In the practical operation of the discontinuous water-gas process the method of procedure may be that seen from the diagram illustrated in Figure 1 of the drawings.

The diagram is intended to illustrate a cycle of a water-gas plant which has a chimney valve controlling the connection of the gas producer to the chimney, a primary valve for the primary air which is blown under the grate, a secondary air valve for secondary air which is blown into the upper part of the gas producer in order to burn the combustible constituents of the so-called hot-blast or blow gases, a purging steam valve for a purge steam pipe through which steam is supplied for purging the smoke or hot-blast gases from the gas producer, a water-gas valve for the up-run water gas offtake pipe for offtake of water gas which comes from the space above the fuel bed of the generator, a steaming valve for up-run steam which is blown under the grate for the production of water-gas, a water-gas valve to withdraw down-run water-gas from below the base of the generator with so-called gasifying with down-run steam from above, and finally a valve steaming to introduce down-run steam, during the gasification from above, into the upper part of the gas producer.

These eight valves or slides of the water-gas plant are to be operated in a certain way which can be seen from the diagram of Figure 1. The arrow indicated by $a_1$ in Figure 1 gives the direction in which the symbols for the processes are to be read on the figure to indicate when they follow each other. The relative position of the valves is clearly indicated in the diagram by having the period during which the separate valves are closed indicated by shaded areas in the diagram and by having the period during which the valves are open indicated by non-shaded areas.

Assuming that the generator is at a stage when it has been cooled down from a preceding down-run water-gas operating period and that the chamber under the grate, which was filled with water-gas, has been washed out by introducing purge steam for a short while. During the short washing or purging, the chimney damper has already been opened. As soon as the introduction of the purging steam has finished, the main or primary air valve is then opened so that hot-blast air can flow under the grate. Shortly after the opening of the primary air valve, the secondary air valve is then also opened, so that the hot-blast gases accumulating in the upper part of the generator can be burnt. This is of particular advantage if a regenerator serving to pre-heat the gaseous water-gas making steam is connected with the gas producer and is heated up during the hot-blast period by the hot blow gases. As soon as the charge of the gas producer is sufficiently hot the secondary air valve and the primary air valve are again closed and then the purging steam valve is opened for a period sufficient to extract the hot blast gases from the gas producer and the adjoining regenerator.

The purging steam valve is then closed and shortly afterwards the chimney damper valve is also closed. The upper up-run water-gas offtake valve is then opened and shortly afterwards the up-run steam valve through which gasifying steam is blown under the grate is opened. This operating period is indicated in the diagram by terms "up-run", "Water gas valve above", and "steaming below grate". After a certain time the direction of make is altered. For this purpose the upper water gas valve and the lower up-run steam valve are closed and the lower down-run water-gas offtake valve and the upper down-run steam valve opened. After the down-run gasification from above has been finished the lower down-run water-gas offtake valve is closed and similarly the upper down-run steam valve. The gas producer charge has now cooled again. The chimney damper valve is then opened and for a short time the purge steam valve is opened in order to drive out the residual water-gas from the space below the gas producer grate and in the gas producer and regenerator. As soon as the short purging has finished the cycle starts anew with the opening of primary air valve. In this way the operation is continually repeated.

The devices which make possible the movement of the valves according to the diagram of Figure 1 are illustrated by way of example in Figures 2-7 of the drawings.

The drawings show the two air valves which are operated during the blast period and the valves which are operated for flow of steam downwardly from above during down run steaming together with the corresponding control device therefor. The control device for the other reversing means for the other devices are similarly constructed so that a further description of the same is unnecessary.

The actual control plant is arranged in a closable cabinet-like housing 1. On the front side the housing 1 has a closable door 2 which in the closed position is held by means of a bolt 4 operated by the hand lever 3.

In the control or switch cabinet there is introduced a pressure medium through the main pressure medium pipe 5, which leads from a compressing device which for the sake of simplicity is not illustrated on the drawings.

Preferably, the device as illustrated on the drawing is supplied with oil at high pressure for the operation of the cut-off valves and control devices. However, instead of pressure oil, pressure water or compressed air can also be used.

From the switch cabinet a pipe 6 leads oil which has lost its pressure back to a connecting device for example, to a pressure oil pump.

Figure 5:
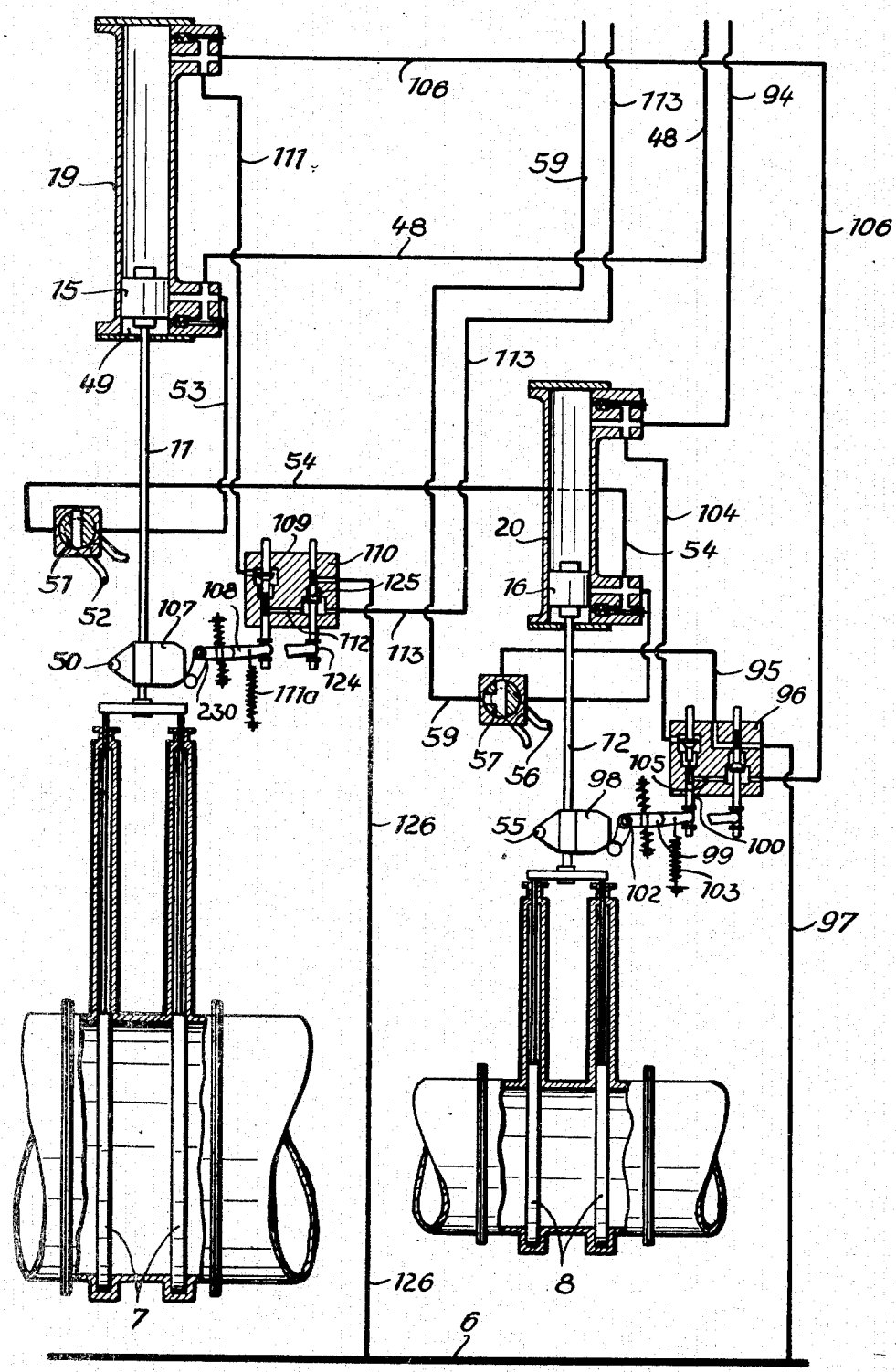
Figure 6:
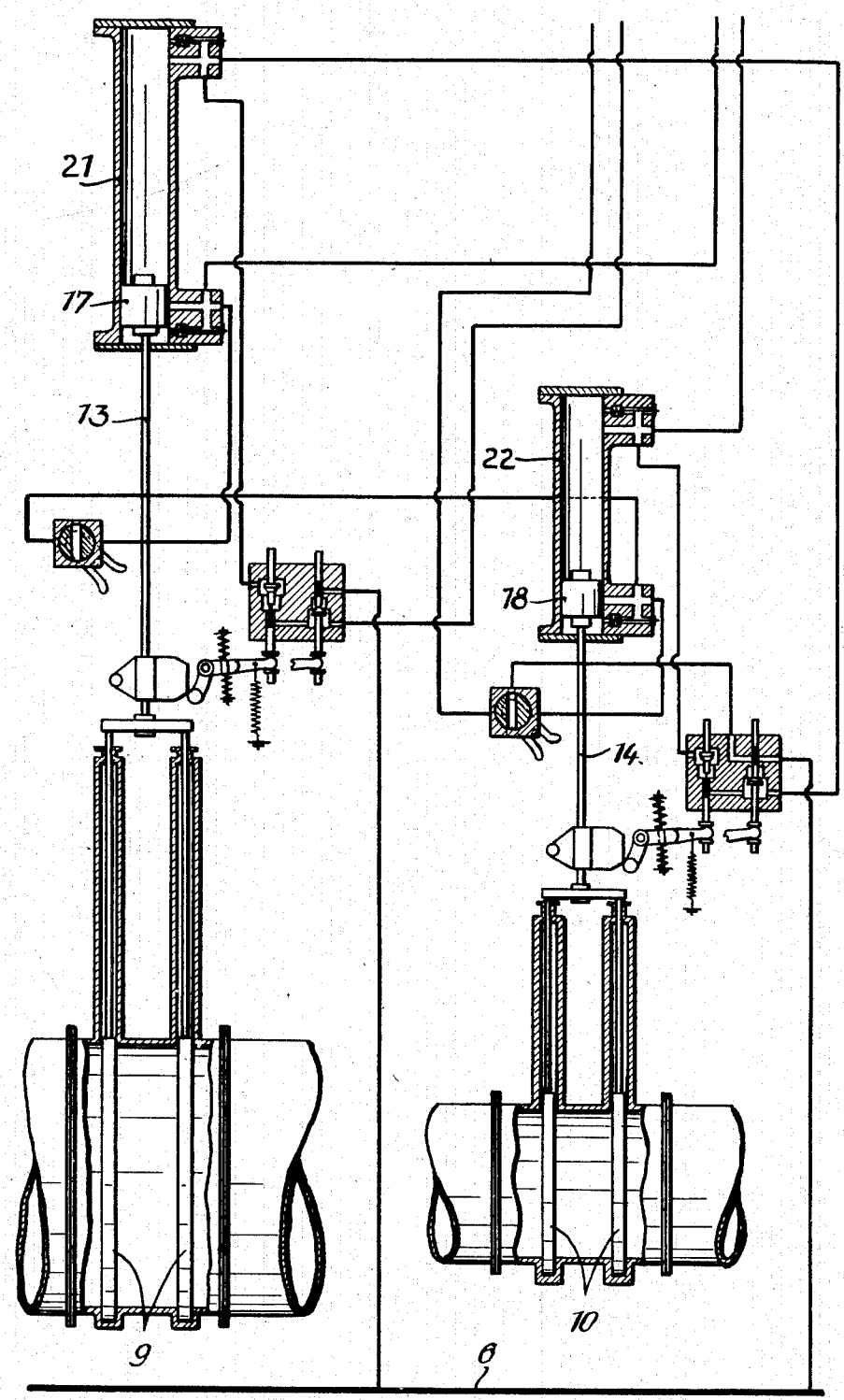

In the drawing, Fig. 5, the main air valve is indicated at 7, the secondary air valve at 8, the lower down-run water gas offtake valve at 9 and the upper down-run steam valve at 10. The valves are seated in the usual housings as illustrated schematically on the drawings. From the valves, operating rods 11, 12, 13, 14 lead to the pistons 15, 16, 17, 18 of cylinders 19, 20, 21, 22 which are double acting.

The switch cabinet 1 is traversed by a shaft 23 which is rotated with constant speed by a motor 24 by means of a reduction gear 25. A hydraulic motor is preferably used to operate the shaft 23.

Inside the switch cabinet there is provided on the shaft 23 a cam disc 26 which has a circumferential cam 27 and on one side a check cam 28 and a check cam 29.

In the range of movement of the circumferential cam 27 there is provided an angle lever 30. If the cam disc 26 rotates in a clockwise direction the angle lever 30 is moved on its pivot in the direction of the arrow by means of the circumferential cam 27. The point of rotation 31 of the angle lever 30 is fixed in position. The end of the angle lever 30, under the action of springs 32 and a connecting rod 33, acts on the valve control lever 34 which pivots about the point 35.

The valve control rods 36, 37 engage on the valve lever 34. The rods 36, 37 each act on a pair of valves 38, 39 and 40, 41, respectively, which are preferably arranged in a common housing 42. The chambers on one side of the valves 41 and 39 are connected with each other through the passage 43 and the chambers on one side of valves 38 and 40 through the passage 44. The chambers lying on the other side of the valves 39 and 40 are connected with each other through the pipe 45 and similarly as to the valves 38 and 41 through the pipe 46.

As can be seen from the drawings the pressure oil pipe 5 is connected with the upper chamber of the valve 41 by means of pipe 5a and a reversing cock 47 (Fig. 2), the function of which will be explained hereafter, the pressure oil pipe 5a lying on the inside of the switch cabinet.

From the position of the valves in the housing 42 it can be seen that the pressure oil can flow through the open valve 41 up to the front of the closed valve 38, and in addition from the chamber of the valve 41 through the pipe 43 up to the closed valve 39. From the pressure oil pipe 5a there extends a branch pipe 5b the function of which will be explained hereafter.

Assuming that the circumferential cam 27 of the cam disc 26 of the control shaft 23 has moved the angle lever 30 whereby the position of the valve control lever 34 has been so altered that the valve rod 37 goes downwards and the valve rod 36 is raised. In this way the valves 41 and 40 are closed and the valves 38 and 39 are opened. Accordingly the pressure medium current is free to flow through the valve 39 and on the other hand as the valve 41 is closed the current of pressure medium to the valve 38 is interrupted. The pressure medium can now flow through the connecting pipe 45 into the upper chamber of the now closed valve 40. From there the pressure medium flows through the pipe 48 into the lower chamber 49 of the hydraulic device 19 (Fig. 5) through which the main air valve 7 is operated. The pressure medium raises the piston 15 upwards and thereby opens the main air valve 7. During the upward movement of the piston rod 11 a cock 51 is reversed by means of an adjustable detent 50 provided on the piston rod 11, the plug of said cock being provided with a correspondingly shaped forked lever 52, in which the detent 50 engages. The cock 51 controls the pipe 53 which is in connection with the pressure medium pipe 48. After opening the cock 51 the pressure medium can thus flow from the pipe 48 through the pipe 53 and the cock 51 into the pipe 54. The pipe 54 leads to the lower cylinder chamber of the hydraulic device 20 which operates the secondary air valve 8. The pressure medium flowing in through the pipe 54 raises the piston 16 whereby the secondary air valve is opened.

On the piston rod 12 of the secondary air valve there is likewise disposed an adjustable detent 55 in the range of which the fork-shaped adjusting lever 56 of a three-way cock 57 is disposed. On the upward movement of the piston rod this three-way cock is reversed in such a way that the pipe 58 which leads from the pressure medium pipe 54 is connected with the pipe 59.

At this period the two air valves are thus opened so that the blast period of the water-gas process can be carried out.

As soon as the cam 27 of the control disc 26 has come within reach of the lower end of the angle lever 30 and the lever has moved the stem 36 up and stem 37 down in the housing 42 with the reversal of the valves, the check cam 28 on the side of the disc 26 abuts against a bolt 60 which is movable longitudinally in the switch cabinet. The bearings for the bolt 60 are for the sake of simplicity not indicated.

The bolt 60 is connected through the rod 61 with a piston 62 which is arranged in a hydraulic cylinder 63. As the check cam 28 rests against the bolt 60 the cam disc 26 is maintained in arrested position and therefore the rotation of the control shaft is interrupted. It is obvious, however, that the drive of the control shaft is not thereby interrupted so that the control shaft 23 can immediately rotate after the check bolt 60 is brought out of range of the check cam 28. The check bolt 60 is withdrawn in the device illustrated immediately after certain further stages in the movement of the valves or of the entire control device have been satisfactorily terminated.

The pressure medium flowing to the hydraulic device of the secondary air valve passes—as already mentioned—after reversal of the three-way cock 57 into the pipe 59 which leads back into the switch cabinet. The pipe 59 is connected to one chamber of a valve 64 which is provided in a housing 65 in the switch cabinet. In addition the pipe 59 is connected with the larger cylinder chamber 66 with a piston 70 of a differential piston device 67 which is disposed in the switch cabinet, by means of a short branch pipe 59a. The device 67 has in addition a smaller cylinder chamber 68 with a piston 71. The pistons of the device 67 are fixedly disposed as indicated at 69. The cylinder-like housing of the device 67 is movable between the pistons. The larger piston 70 and the smaller piston 71 have a longitudinal bore through which the pressure medium can flow into the cylinder chambers. The longitudinal bore of the piston 71 is connected with the pressure medium pipe 5b which is permanently charged with pressure medium, so that the smaller cylinder chamber 68 of the device 67 remains permanently under the pressure of the pressure medium. As soon as the pressure medium acts through the branch pipe 59a on the larger cylinder chamber 66 of the device 67 the cylinder housing 67 is moved in the direction of the arrow 72 whereby the resistance in the smaller cylinder chamber 68 is overcome by the larger force in the cylinder chamber 66.

On the cylinder 67 there is provided an adjustable detent 73, which on movement of the cylinder housing 67 comes within the range of an angle lever 74 which pivots about the point 75. The angle lever 74 acts through the valve rod 76 on the valve 64. On the axle 75 there is also provided a lever 77 which is coupled for movement with the lever 74. The lever 77 acts through the valve rod 78 on a valve 79 which is provided in the housing 65.

The cylinder housing 67 cannot move at any random speed in the direction of the arrow 72 but the time which the cylinder 67 needs in order to come into the other end position is accurately measured through an adjustable device. Through this device, as will be seen hereafter, the time during which the air valves 7 and 8 remain open is determined, in other words, the duration of the blast period.

On the underside of the cylinder housing 67 there is provided a rack 80 in the teeth of which engages a gear wheel 81 which can rotate about the fixed axle 82. The gear wheel 81 is connected by means of the pawl 83 and ratchet wheel 84 with a worm wheel 85a, in which the worm 85 engages. The worm 85 rests on a shaft 86 which is disposed in the switch cabinet. The shaft 86 is constantly rotated by means of a reduction gear 87 (Fig. 2) and an alternating current motor 88. The driving device for the shaft 86 is preferably arranged outside the switch cabinet. The connection between the gear wheel 81 and the worm 85, as through the pawl 83 and the ratchet wheel 84, (shown as drawn to a larger scale in Fig. 8) is constructed in such a way that the gear wheel 81 can rotate quicker in a clockwise direction than the worm wheel 85a whose movement is determined by the rotation of the worm 85. In the opposite direction the gear wheel 81 rotates as fast as desired and independently of the movement of the worm wheel 85a and the worm 85 pawl 83 idling over ratchet 84.

As soon as the detent 73 abuts against the angle lever 74 the operations of the control device which are necessary to close the air valves 7, 8 are instituted. On account of this it is possible by suitable adjustment of the detent 73 accurately to adjust the time during which the air valves 7 and 8 are opened. Obviously, in the arrangement illustrated the detent 73 is always moved at constant speed in the direction towards the angle lever. The speed is kept constant by the device 88, as described. If an alternating current motor is used the speed of rotation of the device 88 adapts itself according to the periodicity of the alternating current used. It is obviously also possible to use instead of an alternating current motor any other driving device which operates with a constant speed of rotation.

If the detent 73 moves the lever 74, the valve 64 is opened and the pressure medium can now flow through a pipe 89 in the housing 65 into the lower chamber of the valve 79 which is closed simultaneously with the opening of the valve 64, that is, is moved upwards. From the chamber of the valve 79 the pressure medium passes into the pipe 90 which leads to one cylinder chamber of the operating piston 62 of the check bolt 60. The pressure medium now moves the operating piston towards the right whereby the bolt 60 is brought out of range of the check cam 28 of the cam disc 26. On this account the cam disc 26 and the shaft 23 can rotate again. In this way the circumferential cam 27 comes out of range of the angle lever 30. The angle lever 30 is now moved back into its original position which corresponds to the position shown in the drawings through the force of the spring 91.

As soon as the circumferential cam 27 has come out of range of the angle lever 30 the check cam 29 on the side of the cam disc 26 abuts against an extension 92 of the check bolt which has come within range of the check cam 29 through movement of the check bolt 60 in the direction of the arrow 93. In this way the movement of the cam disc 29 is again stopped.

Through the reversal of the angle lever 30 into the position shown in the drawings the valves 38, 39, 40, 41 likewise assume the position shown on the drawings. On this account the current of the pressure medium from the pipe 5b through the previously opened valve 39 is interrupted and on the other hand the current of pressure medium is free to flow through the opening controlled by the valve 41. The pressure medium, therefore, passes into the pipe 94 which leads from the lower chamber of the valve 41 and which leads to the upper cylinder chamber of the hydraulic device 20 of the secondary air valve. The secondary air valve is on this account moved downwards and the three-way cock 57 is thereby reversed, that is, brought into the position shown on the drawings. In this way the pipe 59 is brought into connection with the pipe 95 which leads through the valve housing 96 into the pipe 97 for the pressure medium released from pressure and is connected with the main pipe 6 for pressure medium released from pressure. On this account the pressure oil in the larger cylinder chamber 66 of the differential piston device 67 can release its pressure and the cylinder 67 is now moved in the opposite direction to the arrow 73 by the pressure medium into the smaller cylinder 68, which is permanently in connection with the pressure medium pipe 5. In this way the pawl 80 slides idly over the teeth of the pawl ratchet wheel 84. The device 67 is thus likewise brought back into its initial position.

If the secondary air valve 8 has come into its lower end position in which the air pipe is satisfactorily closed, a detent 98 provided on the piston rod 12 abuts against an angle lever 99 which acts by means of a rod 100 on a valve 101 which is arranged in the housing 96. The actuating lever 99 which can pivot about the fixed axle 102 is under the action of a spring 103 so that when the detent 98 moves upwards valve 101 is automatically drawn into the lower closed position.

The valve 101 is opened by the movement of the adjusting lever 99 effected by the detent 98. The upper chamber of this valve is connected by means of the pipe 104 with the pressure medium pipe 94, that leads to the upper cylinder chamber of the device 20, and through which pressure medium flows at this period. The pressure medium now flows through the opened valve 101 into a connecting pipe 105 which is provided in the housing 96 and passes from there into a pipe 106 which leads to the upper cylinder chamber of the hydraulic device 19 appertaining to the main air valve 7.

The pressure medium entering in the upper cylinder chamber of the device 19 moves the working piston 15 of the valve 7 downwards, whereby the main air valve is closed. If the valve 7 finally reaches the end closing position an adjustable detent 107 provided on the piston rod 11 acts on a valve lever 108 which is constructed similarly to the valve lever 99. The valve lever 108 opens a valve 109, disposed in the housing 110, when it is moved upwards in the direction of the arrow. A spring 111a is provided and draws the valve lever 108 downwards as soon as the detent 107 comes out of range of the valve lever 108. The spring 111a thus serves to close the valve 109 automatically.

If the valve 109 is opened, pressure medium can flow from the pipe 111 which is connected with the pipe 106, through the chamber of the valve 109 and a pipe 112 provided in the valve housing, into the pipe 113. This pipe 113 leads to the right cylinder chamber of the hydraulic device 63 in which is disposed the operating piston 62 for the check bolt 60. Through the pressure medium the piston 62 is moved back towards the left into the position shown in the drawings. The check bolt 60 is moved correspondingly and in this way the extension 92 of the check bolt 60 is moved out of the range of the check cam 29 of the cam disc 26. The cam disc 26 is now freed so that the control shaft 23 can again rotate further.

The control shaft 23 continues to rotate until the circumferential cam 114 of another cam disc 115, which is disposed on the shaft 23, moves within range of its valve operating lever 116 which is constructed similarly to the valve operating lever 30 for the cam disc 26.

The control shaft 23 thus also carries other different cam discs, viz., a cam disc for the chimney damper, and further cam discs for steam valves, water-gas offtake valves, and the like, according to the construction of the water-gas plant. The cam discs are all similarly constructed so that the control shaft is always held stationarily in position during the movement of a valve or a valve group, and is only freed again after the movement of the corresponding valve or valve group is satisfactorily terminated. It is immaterial how many cam discs are in this way arranged on the control shaft 23. However, the arrangement of the cam discs and their diameters must be such that the cams of the different discs do not actuate their corresponding bell crank levers (e. g. 30) at the same time.

The valve housing 117 co-operating with the cam disc 115 is connected through the pipe-line 118 across a three-way cock 119 (Fig. 3) to the pipe-line 5b which is permanently supplied with pressure medium from the pipe-line 5, 5a. At the moment in which the cam 114 therefore comes within range of the valve lever 116 and moves the valve provided in the housing 117 in a similar manner as described previously for the housing 42, the movement of the valves 9 and 10 is started. The time during which the valves 9 and 10 remain open is controlled through a time measuring device 120 which is constructed in a similar way to the device 67 and is connected with the shaft 86 which is kept rotating at constant speed. As soon as the time measuring device 120 has completed its stroke and the valve lever 122 has been actuated by the adjustable detent 121 the two valves 9 and 10 are again closed with the corresponding operation of the check bolt 123 which co-operates with the check cams 124 of the disc 115. After termination of the movements of the valves 9 and 10, the cam disc 115, and with it the shaft 23, can rotate again either to bring a further disc disposed on the shaft 23, into action or to set in operation the first of the cam discs so that the cycle then may commence again from the beginning.

For the valve 101, 109, etc., actuated by the slides 7, 8, 9, 10 in their lower end positions, special devices are also provided in order to stop a further flow of the pressure medium, if for any reason any one of the pressure medium valves, controlled by the slide valves 7, 8, 9 and 10, fails to operate. This safety device which is present with all the slide valves 7, 8, 9, 10 is described with reference to the arrangement of the slide valve 7.

With the valve lever 108 which can rotate about the fixed axle 230 there is coupled a second valve lever 124 so that with the operation of the lever 108 the lever 124 is also moved. The lever 124 acts on a valve 125 which is arranged in the valve housing 110 and controls a pipe 126 which is connected with the collecting pipe 6 for the pressure medium from which the pressure has been released. If the valve 109 is opened the valve 125 is closed and vice versa. In each position of the valve levers 108 and 124 one valve is always securely closed and the other is opened.

The pressure medium flowing into the valve housing 110 through the pipe 111 can then only act on any other device if the valve 125 is closed, that is, if the valve levers 108 and 124 are brought into a position corresponding to the true end position of the valve 7. If the valve 125 is not completely closed the pressure oil flowing into the housing 110 from the pipe-line 111 would escape through the open valve 125 into the pipe 126 for pressure oil released from pressure and no pressure oil would flow into the pipe 113 which leads to the operating device of the check bolt 60. In this way a simple but effective safety means for guarding against faults in the operation of the valves 109 and 125 is obtained.

A device is also provided in order to put the time measuring devices 67 and 120 out of operation by hand. For example, in water-gas operation it may under some circumstances be desirable to shorten the hot-blast period for an exceptional reason.

In order to put the time measuring device 67 out of operation for such contingencies there is provided the three-way cock 119, and in order to put the time measuring device 120 out of operation there is provided the three-way cock 127. The two three-way cocks 119, 127 are each disposed in a pipe line through which pressure medium flows to the control valves for the next cam disc.

Moreover, the three-way cock 119 is connected through the pipe 128 with the pipe 129 which is connected to the pipe 6 for pressure medium released from pressure, which lies in the switch cabinet. In a similar way, the three-way cock 127 is connected through the pipe 130 with the pipe 131 which is likewise connected to the pipe 6 for pressure medium released from pressure, lying in the switch cabinet. The reversing cocks 119 and 127 are actuated by means of hand levers 132, 133 which project outside of the switch cabinet and can be reversed by hand by the operator of the plant. On the hand levers 132 and 133 there are provided projections 134, 135 which lie in the range of the valve lever 77 and the corresponding valve lever 136, which cooperates with the cam disc 26 and 115. If the hand lever 132 is moved in the direction of the arrow so that it is rotated 90° with respect to the position shown on the drawing, the three-way cock 119 connects the pipe-line 118 with the pipe 128 for pressure medium released from pressure and the connection between the pipe 118 and the pressure medium pipe 5b is broken. Simultaneously, the valve 79 in the housing 65 is closed and simultaneously the valve 64 is opened by the valve lever 74. The position of the valves then corresponds to that which they assume if the detent 73 of the time measuring device 65 had operated the valve levers 74, 77. The pressure medium thus flows through the housing 65 and now acts on the operating piston 62 of the check bolt 60. On this account the check cam 28 of the cam disc 26 is free and the cam disc 26 can rotate further by a certain amount so that the circumferential cam 27 moves out of range of the lever 30. This has the result that the lever 30 is withdrawn under the action of the spring 91 and the valves in the housing 42 are reversed so that the closing movement of the valves 7 and 8 begins. At the same time the hand lever 132 must then be swung back into the position indicated on the drawings whereby the pressure medium pipe 5b is again connected with the pressure pipe 118 leading to the two valves and the latter valves are set in operation. If the hand lever 132 is not moved back into the position shown on the drawings the control shaft 23 rotates further until the outer lateral check cam of a cam disk, for example, the check cam 124 of the cam disk 115, rests against the corresponding check bolt (123 for the disc 115). Then the valves in the housing 117 are also operated through the circumferential cam of the disc 115 (as described for the housing 42). However, no movement of the corresponding cut-off valve is possible since the supply of pressure medium through the cock 119 is interrupted. As soon as the cock 119 has again returned to the position shown on the drawings, pressure medium flows to the housing 117 and from there to the cut-off valves 9, 10 which are then opened.

In the same way the time measuring device 120 can be put out of operation by means of the hand lever 133.

The hand levers 132, 133 are thus used if the time interval during which one of the valves or groups of valve is usually opened, is to be shortened. If this time is to be extended the eccentric levers 137 and 138 which are provided on the valve levers 74 and 122, respectively, are moved in such a way as to move the engaging rollers shown for the detents out of the path of the detents 73, 121 so that the ends of the levers 74, 122 are outside the range of actuation by the detents 73, 121 of the time measuring devices. The time measuring device can then be moved completely into the other end position without the detents 73, 121 acting on the valve levers. This means that the valves 7 and 8 or 9 and 10 can remain open as long as desired until the eccentric levers 137 or 138 are again moved into the position shown on the drawings.

Figure 7:
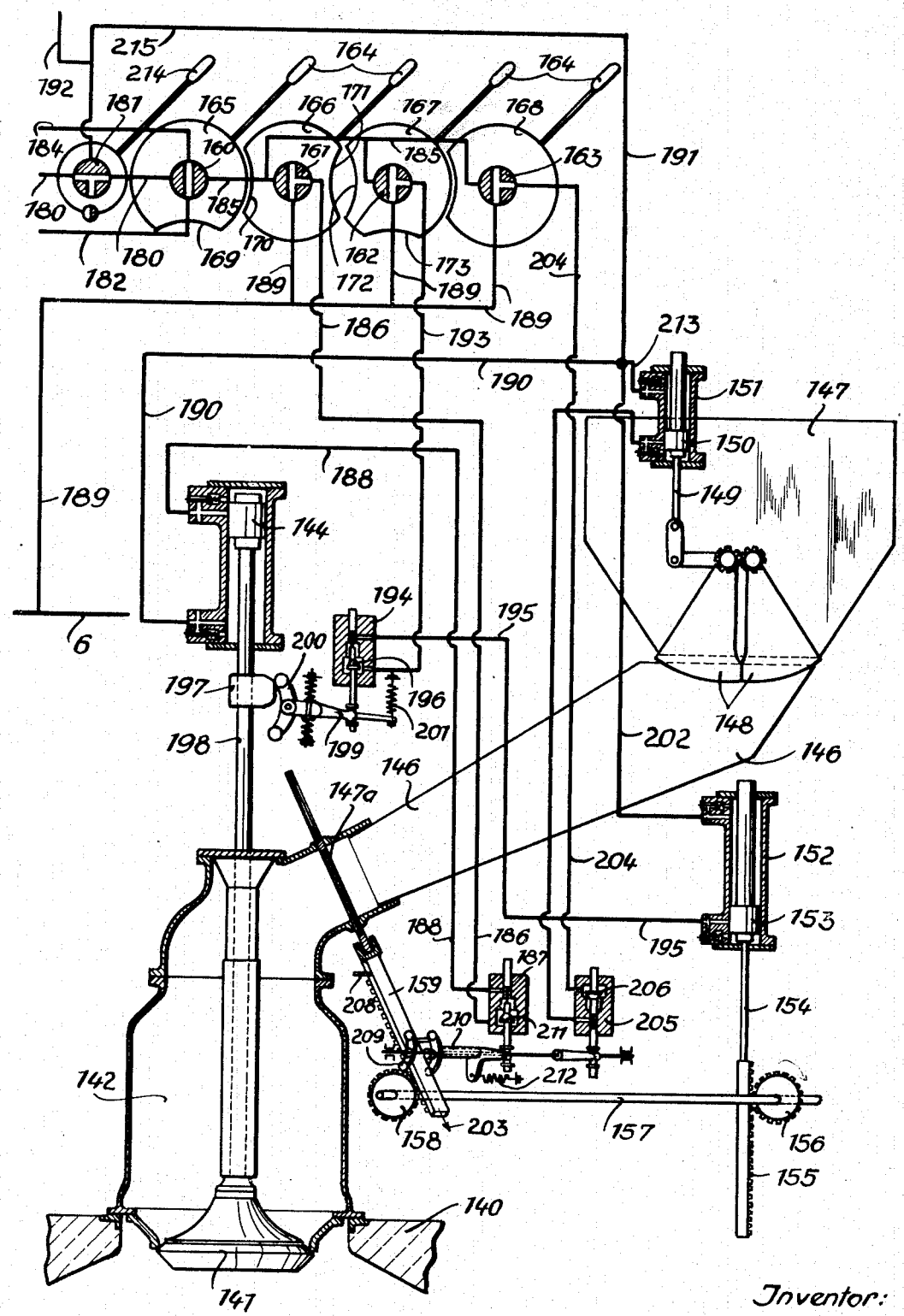

In Figure 7 of the drawings there is shown schematically the operating mechanism for the device for supplying the gas producer with fuel.

On the cover 140 of the gas producer there is provided an opening, closable by means of a conical body 141, which leads to a charging hopper 142. The closing body 141 is carried on an operating rod 198 which passes through the cover of the hopper housing 142 and is connected with the piston 144 of a double acting hydraulic cylinder 145.

The hopper housing 142 is fed with the fuel from a pipe 146 which is controlled by a valve 147a. To the pipe 146 there is connected the lower end of a supply bunker 147. The connection between the fuel bunker 147 and the pipe 146 is controlled through closure flaps 148 which are connected through the piston rod 149 with the piston 150 of a hydraulic device 151. The device serves to open or close the flaps 148 as required.

For the operation of the closure valve 147a there is provided the hydraulic device 152, whose piston 153 is connected through the piston rod 154 with a rack 155 which engages the gear wheel 156. The gear wheel shaft 157 carries at the other end the gear wheel 158 which engages a rack 159 connected with the cut-off valve 147a.

For the operation of the supplying device there is provided a series of cocks 160, 161, 162, 163 which can be operated by means of the hand levers 164 and are disposed in the neighbourhood of the supply device so as to be easily accessible by the operator of the plant. The cocks 160, 161, 162, 163 are provided with discs 165, 166, 167, 168 respectively. These discs are so arranged that the cocks can only be moved in the direction from left to right on the drawings. If, for example, the cock 160 is rotated in such a way that the handle 164 assumes a position vertically to the position shown on the drawings then a recess 169 of the disc 165 comes within the range of rotation of the disc 166 which has a recess 170 and a recess 171. The recess 170 allows rotation of the disc 165. When the recess 169 lies opposite the disc 166, the disc 166 can be rotated by 90°. With this, however, the disc 166 engages in a recess 172 of the disc 167. The disc 167 can thus only be rotated if the disc 166 has the position shown on the drawings. Finally, the disc 168 can only be rotated if the recess 173 of the disc 167 is turned towards the disc 168.

The charging of the gas producer is best effected during the so-called gasification from above, that is, during down-runs. During the gasification from above steam is introduced from above through the gas producer charge so that the space above the gasifying charge and below the gas producer cover 140 is filled with steam at low pressure. The time measuring device 120 relating to the cam disc 115 may determine the duration of the so-called gasification from above. As soon as the gasification from above has begun the pressure medium remains in the pipe 174 (Fig. 4), which leads to the housing 175 in which lie the valves 176, 177 which are moved by movement towards the right of the time measuring device 120. The housing 175 has a pipe 179, coming from the chamber 178 of the valve 176, to which is connected a pipe 180, which leads through a three-way cock 181 (Fig. 7) the function of which will be explained hereafter, to the reversing cock 160. The pipe 180 is thus filled by pressure medium when the time measuring device 120 starts to move.

On the other hand the chamber of the valve 177 of the housing 175 is in connection with the pipe 182 which corresponds to the pipe 90 in the device with the cam disc 26. The pipe 182, however, does not lead directly to the hydraulic device 183 for the check bolt 123 but leads first of all to the reversing cock 160. From the reversing cock 160 the pipe 184 then leads to the actuating device 183 for the check bolt 123. In the position of the cock 160 shown on the drawings the pressure medium can thus flow from the housing 175 after operation of the lever 122 by the time measuring device 120 into the pipe 182 and from there into the pipe 184 so that after the running down of the time measuring device the check bolt 123 is operated in the described manner. However, as soon as the cock 160 has been moved by means of the handle 164 in order to operate the fuel supply device the connection between the pipe 182 and the pipe 184 is interrupted. Thus, no pressure medium can flow to the operating device 183 of the check bolt 123 until the fuel supply device of the gas producer is restored again in the position in which 141 is in closed position, independent of whether the time measuring device 120 has or has not run down in the meantime. Through movement of the cock 160 the pressure medium pipe 180 is connected through the pipe 185 with the cocks 161, 162, 163 which at this moment, however, are still closed. Then by operating the hand lever 164 the cock 161 is rotated by 90°. In this way the pipe 185 is brought into connection with the pipe 186 so that the pressure medium can flow through a valve housing 187 into the pipe 188 and from there into the upper cylinder chamber of the operating device 145. On this account the piston 144 of the operating device 145 is moved downwards and the closure body 141 is lowered in the gas producer so that the hopper housing 142 is in connection with the gasifying shaft. The fuel in the hopper 146, 147 cannot fall over into the gasifying shaft during this time. As soon as the hopper 142 is discharged the lever 164 of the cock 161 is again brought into the position shown on the drawings. Through the cock 161 the pipe 186 previously filled with pressure medium and the member co-operating therewith is connected with the pipe 189 which is connected with the collecting pipe 6 for pressure medium released from pressure.

The other cylinder chamber of the device 145 is now connected through the pipe 190 with the pipe 191 which is itself connected to the pipe 192 which is connected with the pressure medium pipe 5a leading into the switch cabinet. The operating device 145 is constructed as a differential piston in such a way that the piston 145 can be moved from the position shown on the drawings, by the pressure medium entering into the upper cylinder chamber, against the pressure medium in the lower cylinder chamber. If the upper cylinder chamber of the device 145 is now connected with the pipe for pressure medium released from pressure, by means of the pipe 188 and the valve housing 186, the cock 161 and the line 189, the actuating piston 144 is moved upwards by the pressure medium flowing from the pipe 190 and the filling hopper 142 of the gas producer is thereby closed.

The cock 160 can now again be moved into the position shown on the drawings, so that the pressure medium can flow after the running down of the time measuring device 120, through the pipe 182 into the pipe 184 to the operating device 183 of the check bolt 123. By operation of the check bolt 123 the movement of the control member proceeds.

The fuel hopper 142 of the gas producer is now to be recharged with fuel. Should this take place during the running down of the time measuring device 120 the cock 160 remains in open position so long as the pressure medium pipe 180 is to remain in connection with the pipe 185. The cock 162 is moved so that the pipe 185 is connected with the pipe 193 which leads through a valve housing 194 to the pipe 195, which leads to the lower cylinder chamber of the operating device 152. The valve 196 disposed in the housing 194 has in the meantime been opened through an adjustable detent 197 on the operating rod 198 of the piston 144. For this purpose there is provided an operating lever 199 which rotates about the fixed pin 200. The valve 196 is thus opened in the closed position of the closure body 141. If the closure body 141 moves downwards the valve 196 is automatically closed by the spring 201.

The hydraulic device 152 is likewise constructed as a differential piston. The upper cylinder chamber of the device 152 is connected through the pipe 202 with the pipe 191 and is thus permanently charged with pressure medium.

The pressure medium flowing through the pipe 195 into the lower cylinder chamber after reversal of the cock 162 moves the piston 153 upwards since the pressure surface on the upper side of the piston 153 is smaller than that on the underside. By raising the piston 153 the rack 155 is also raised and therefore the shaft 157 is rotated in a clockwise direction. On rotating the shaft 157 the gear wheel 158 moves the rack 159 in the direction of the arrow 203, whereby the closure valve 147a is withdrawn from the fuel supply pipe 146.

The cock 163 is now rotated by means of its hand lever 164 so that the pipe 185 filled with pressure medium is connected with the pipe 204. The pipe 204 leads to a valve housing 205 in which a valve 206 is disposed and on the other hand the valve housing 205 is connected with the pipe 207 leading to the lower cylinder chamber of the operating device 151 which serves to operate the closure flaps 148 of the fuel bunker.

The rack 159 of the closure valve 147a has a detent 208 in the range of which lies a lever 209 which is connected with a cam shaft 210 which on the one hand acts on the valve 211 in the valve housing 187 and on the other hand on the valve 206 in the valve housing 205. Through the action of the spring 212 the cam shaft 210 is held in such a way that normally the valve 211 is opened and the valve 206 is closed.

As has been described in the foregoing, the pressure medium flows through the housing 187 before it passes to the operating device 145 for the hopper closure 141. The valve 211 is opened so long as the closure valve 147a is closed so that the fuel can therefore only be allowed to pass from the hopper 142 into the gas producer if the charging pipe 146 is closed.

If the closure valve 147a is withdrawn as described above, which is only possible by means of the position of the recess 171 on the cock disc 166, if the closure body 141 is closed, the detent 208 moves the cam shaft 210 in such a way that the valve 211 is closed and therefore the valve 206 is opened.

Through the opening of the valve 206 the path from the pipe 204 into the pipe 207 is freed to pass the pressure medium so that the closure flaps 148 of the fuel bunker are opened. Fuel can thus only be allowed to flow into the hopper 142 from the bunker 147 if the closure valve 147a and the bunker flaps 148 are opened.

As soon as the hopper 142 is recharged the fuel flaps 148 can be closed. This is effected by moving the cock 163 into the position shown on the drawings. In this way the pipe 204 is connected with the pipe 189 so that the pressure medium can escape from the lower chamber of the operating device 151. The upper cylinder chamber of the operating chamber 151 which is likewise constructed as a differential piston is connected through the pipe 213 with the pipe 191 permanently filled with pressure medium. On this account the piston 150 is now moved downwards and the flaps 148 are closed.

After moving the cock 163 the cock 162 can again be brought into the position shown on the drawings. In this way the pipe 193 is connected with the pipe 189 for pressure medium released from pressure, so that the piston 153 is moved downwards into the position shown on the drawings under the action of the pressure medium flowing in through the pipe 202.

All valves and flaps of the supply device are now closed and are brought into the position shown on the drawings.

The cock 160 can now be moved again into the position shown on the drawings so that the pressure medium can effect the further movements of the control members.

In order to operate the supply device of the gas producer at any desired time there is provided the cock 181. The cock 181 is a three-way cock and can be actuated by means of the handle 214. By moving the cock 181 the pressure medium pipe 215, which is permanently connected with the pressure medium pipe 192, can be connected with the pressure medium pipe leading to the cock 160 whilst at the same time the pipe 180 is cut off. The cock 160 is thus supplied with pressure medium and if it is operated by movement of the handle 164 in such a way that the pipe 185 is connected with the pipe 215 leading to the cock 181, the pressure medium can flow into the operating cylinder of the fuel supply device.

As has already been described above the pressure medium for the actuating device, cut-off valves and the fuel supply device, flows through the pipe 5 into the switch cabinet 1. In the pipe 5 there is provided the three-way cock 47 which can be moved by means of a handle 3 projecting outside the housing. The position of the handle 3 shown on the drawings and of the cock 47 is the normal position. In this position of the cock 47 the pressure medium can flow into the pipe 5a and from there also into the pipe 192 which leads to the supply device.

If the hand lever 3 of the cock 47 is moved upwards the connection of the pipe 5a with the pressure medium pipe 5 is interrupted and the pipe 5a is connected with a pipe 217 for pressure medium released from pressure. The pipe 217 leads to the collecting pipe 6 for pressure medium released from pressure.

The door 2 leading into the inside of the switch cabinet is closed by means of the bolt 4 which is likewise operated by the lever 3. As can be immediately seen from the drawings the door 2 of the switch cabinet can only be opened if the cock 47 is moved to pressure release position and therefore the pressure medium supply from the pipe 5 interrupted. It is thus not possible to have access to any of the control members lying inside the switch cabinet before the control apparatus has been stopped by cutting off the supply thereto of the pressure medium. The bolt 4 is, moreover, preferably so constructed that it cannot be moved downwards so long as the door 2 of the switch cabinet is open. These special means for the bolt 4 are omitted from the drawings for the sake of simplicity.

On the inside of the door 2 there are also provided one or more hooks 218 behind which engage the ends 219 of angle check levers 220, which pivot on the fixed pin 221. The angle lever 220 engages in a recess of the check bolt 60 in such a way that the lever 220, on moving the check bolt towards the right (on the drawings) is moved in a clockwise direction. Through this movement the end 219 of the angle lever 220 is brought under the hook 218 and thereby the door 2 is bolted.

In a similar way checking levers 220 are also provided for the other check bolts, for example, for the check bolt 123, the check lever 222.

The door 2 can thus only be opened if the check bolt is in the position shown on the drawings. This is, however, the position in which the cut-off operating valves are all closed. The switch cabinet can thus only be opened if the apparatus is in a completely safe condition.

The check levers (220, 222, etc.) can also be used, in exceptional cases, after opening the door 2 to control the control apparatus by hand, to position the check bolts, (60, 123, etc.) by mahipulation of the levels (220, 222, etc.) as required by the position of the cams on the cam discs (26, 115, etc.).

For controlling the valves which control the pressure medium current to the valves or groups of valves cam discs are provided in the devices illustrated, but instead of these it is, however, also possible to use other similar members, for example endless chains, which are provided with adjustable co-operating members and are stretched between two or more chain wheels which are connected with the driving motor.

On the drawings the device is only illustrated schematically in accordance with requirements. It is quite obvious to a technician that the principal members shown can be substituted by the usual practical devices for water-gas plants.

Various changes may be made in the details disclosed in the foregoing specification without departing from the invention in all its aspects and the advantages thereof.

In the claims affixed to this specification no selection of any particular modification of my invention is intended to the exclusion of other modifications thereof.

I claim:

1. In apparatus for automatic sequential control of fluid pressure operated valves, a main drive shaft; a control disc thereon; a pilot valve for controlling the operation of an operating valve; actuating means operable by the control disc for actuating the pilot valve, two oppositely disposed arresting cams on the control disc, a check bolt reciprocable into and out of engagement with the arresting cams whereby further movement of the control shaft is checked by one arresting cam during opening movement by the pilot valve and by the other arresting cam during closing movement by the pilot valve, a fluid pressure operated cylinder for reciprocating the check bolt; fluid pressure lines therefor each having a valve controlled by the open and closed positions of the operating valve; and timing device operable by fluid pressure in one of the lines controlled by a valve operated by the operating valve in its end position, for timing the open position period of the operating valve, and cut-off valve means operable by said timing means for controlling the flow of fluid pressure in one of the lines to the check bolt operating cylinder, to release the main drive shaft for further movement.

2. Automatic control according to claim 1, characterised in that with the timing device there is connected an adjustable stop through the adjustment of which the time in which the cut-off valve means is opened by the timing device can be varied.

3. Automatic control according to claim 1, characterised in that from the operating valve in the end position two valves are operated, one of which controls the flow in a pressure medium supply pipe and the other a connection of the pressure medium supply pipe to an exhaust pipe for pressure medium released from pressure, and in which the two valves are disposed so that with the opening of one valve the other is closed.

4. Automatic control according to claim 1, characterised in that the cut-off valve means which is operated by the timing device and which controls the flow of pressure medium in one of the lines to the hydraulic cylinder for the check bolt, is provided with and can be opened by a hand lever.

5. Automatic control according to claim 1, characterised in that a common electric motor is provided for the control discs for a series of operating valves or valve groups.

6. Automatic control according to claim 1, characterised in that all of the control members for the valves or valve groups except the valves operated by the operating valve are arranged in a closable housing which is provided with a door whose closure member is interlocked with a main cut-off cock for the supply of pressure medium in such a way that the cock is closed if the door is open.

7. Automatic control as claimed in claim 1 in which the cut-off valve-means which is operated by the timing device, and which controls the flow of pressure medium in one of the lines to the pressure cylinder for the check bolt is provided with and is capable of operation by a hand lever to open the same for flow to release the check bolt, and in which the hand lever is connected to be operated by the operation of a cut-off lever and valve therefor which, when operated, closes a pressure medium branch supply line which leads to similar mechanisms for operating another operating valve or valve group which is to be operated next in the cycle of operations.

8. Automatic control as claimed in claim 1, and in which a discharge closure for a charging container acting as a seal on a gas producer cover, a closure controlling the filling opening to this container, and an outlet opening closure of a fuel supply hopper for the filling opening, are each provided with a fluid pressure operated operating device, and in which the pressure medium lines to these operating devices are provided with means connecting them to receive pressure medium from the cut-off valve-means that is operated by the timing device before operation thereby, and in which the pressure medium lines to these operating devices are controlled by hand cut-off cocks which are connected with each other in a manner to be operated only in a predetermined sequence, and in which the pressure lines for the fuel supplying devices are connected to intercept the pressure medium line which leads from the cut-off valve means, that is operated by the timing device, to the pressure cylinder for the check bolt.

9. Automatic control as claimed in claim 1, and in which a discharge closure for a charging container acting as a seal on a gas producer cover, a closure controlling the filling opening to this container, and an outlet opening closure of a fuel supply hopper for the filling opening, are each provided with a fluid pressure operated operating device, and in which the pressure medium lines to these operating devices are provided with means connecting them to receive pressure medium from the cut-off valve-means that is operated by the timing device before operation thereby, and in which the pressure medium lines to these operating devices are controlled by hand cut-off cocks which are connected with each other in a manner to be operated only in a predetermined sequence.

10. Automatic control as claimed in claim 1, and in which a discharge closure for a charging container acting as a seal on a gas producer cover, a closure controlling the filling opening to this container, and an outlet opening closure of a fuel supply hopper for the filling opening, are each provided with a fluid pressure operated operating device, and in which the pressure medium lines to these operating devices are controlled by hand cut-off cocks which are connected with each other in a manner to be operated only in a predetermined sequence, and in which the pressure medium lines to the pressure operated supply devices and the pressure medium line which leads from the cut-off valve-means that is actuated by the timing device to the pressure cylinder for the check bolt are connected in such manner by a reversing cock that on opening the pressure line to the pressure operated supply devices the pressure line to the cylinder for the check bolt is closed and vice versa.

11. Automatic control as claimed in claim 1, and which includes a brake-element connected with the timing device so as to influence the movement of the timing device in one direction by restraining its movement under the fluid pressure, while still allowing it to move, under its fluid pressure, against the brake-action of the brake-element therefor.

12. Automatic control as claimed in claim 1, and in which the operating-valve-controlled fluid pressure line that operates the timing device leads to and is controlled by the cut-off valve means, and in which the timing device, after reaching its end position, actuating the cut-off valve means, is freed from the pressure medium in said line by the release of said line by the actuation of the cut-off valve means, and in which fluid pressure operated means are provided for automatically returning the timing device to its initial position.

13. Automatic control as claimed in claim 1, and in which an electric motor, adapted to run with a constant speed of rotation, is connected with the timing device through gearing adapted to restrain the movement of the timing device while still allowing it to move, in order to determine the speed of movement of the timing device for the cut-off valve means.

14. In apparatus for automatic sequential control of fluid pressure operated valves, a series of pilot valves so constructed as to control the flow of fluid pressure to the respective operating valves; sequence control elements mounted for rotation in unison so arranged as to determine the sequence of movements of the respective pilot valves; actuating means so constructed as to be operable by the sequence control elements for operating the respective pilot valves; stop means for the respective sequence control elements so arranged as to arrest all the control elements when one actuates its pilot valve; fluid pressure operated release means for the respective stop means having pressure lines leading thereto from the operating valves, for operation of the release means by fluid pressure from the operating valves on the end position of the operating valve; valve means interposed in the latter lines and so constructed as to interrupt the flow of fluid pressure from the operating valves to the release means; and timing means operable by fluid pressure in said latter lines and so arranged as to actuate the interposed valve means and constructed to be set to effect the actuation after a set interval of time to release the flow of fluid pressure from the operating valves to the release means to actuate the same, and thus determine the duration of the period of time the operating valves remain open before their pilot valves are actuated by further movement of the sequential control elements to close the operating valves.

JOSEPH DANIELS.